(12) United States Patent
Wideman et al.

(10) Patent No.: US 6,476,115 B1
(45) Date of Patent: Nov. 5, 2002

(54) SILICA REINFORCED RUBBER COMPOSITION WHICH CONTAINS OLEYLAMMONIUM BROMIDE AND/OR MERCAPTOIMIDAZOLIUM BROMIDE COUPLING AGENTS TO ENHANCE ELECTRICAL CONDUCTIVITY AND ARTICLE OF MANUFACTURE, INCLUDING A TIRE, HAVING AT LEAST ONE COMPONENT COMPRISED OF SUCH RUBBER COMPOSITION

(75) Inventors: Lawson Gibson Wideman, Hudson, OH (US); David John Zanzig, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/944,818

(22) Filed: Aug. 31, 2001

(51) Int. Cl.[7] .............................. C08J 3/02; C08K 3/34; C08K 3/04; C08L 57/02; B60C 5/00
(52) U.S. Cl. ...................... 524/492; 152/151; 152/450; 152/905; 264/501; 523/200; 523/215; 523/216; 524/493; 524/495; 524/496; 524/499; 524/186; 524/236; 524/247; 524/262; 524/93
(58) Field of Search ................................. 150/151, 450, 150/905; 264/501; 523/200, 215, 216; 524/492, 493, 495, 496, 499, 186, 236, 247, 262, 93

(56) References Cited

U.S. PATENT DOCUMENTS

| | | | |
|---|---|---|---|
| 5,094,829 A | 3/1992 | Krivak et al. ............... 423/339 |
| 5,679,728 A | 10/1997 | Kawazura et al. .......... 523/215 |
| 5,708,069 A | 1/1998 | Burns et al. ................ 524/403 |
| 5,750,610 A | 5/1998 | Burns et al. ................ 524/434 |
| 5,789,514 A | 8/1998 | Burns et al. ................ 528/12 |
| 6,028,137 A | 2/2000 | Mahmud et al. ............ 524/496 |

OTHER PUBLICATIONS

*Encyclopedia of Chemical Technology*, Kirk–Othmer, 4th Edition, vol. 21, (1997), "Recycling, Oil to Silicon". pp. 1020 through 1026.

*Primary Examiner*—Patrick D. Niland
(74) *Attorney, Agent, or Firm*—Henry C. Young, Jr.

(57) ABSTRACT

This invention relates to a conjugated diene-based rubber composition reinforced with silica-based reinforcement together with a non-silane coupling agent as N-3-(1,2-dihydroxypropyl)-N-oleylammonium bromide and/or N-3-(1,2-dihydroxypropyl)-N-methyl-2-mercaptoimidazolium bromide for endeavoring to both couple synthetic aggregates of precipitated silica to elastomers and enhancing electrical conductivity of such rubber compositions which contain less than 25 parts by weight carbon black per 100 parts by weight elastomer. Said coupling agent materials may be provided for mixing with said diene-based rubber(s), for example, as individual materials, as at least one of said materials being supported on a carbon black carrier or as being pre-reacted, or otherwise pre-treated, with synthetic silica aggregates. The invention includes an article of manufacture, including a tire, having at least one component comprised of such rubber composition.

20 Claims, No Drawings

SILICA REINFORCED RUBBER COMPOSITION WHICH CONTAINS OLEYLAMMONIUM BROMIDE AND/OR MERCAPTOIMIDAZOLIUM BROMIDE COUPLING AGENTS TO ENHANCE ELECTRICAL CONDUCTIVITY AND ARTICLE OF MANUFACTURE, INCLUDING A TIRE, HAVING AT LEAST ONE COMPONENT COMPRISED OF SUCH RUBBER COMPOSITION

FIELD OF THE INVENTION

This invention relates to a conjugated diene-based rubber composition reinforced with silica-based reinforcement together with a non-silane coupling agent as N-3-(1,2-dihydroxypropyl)-N-oleylammonium bromide and/or N-3-(1,2-dihydroxypropyl)-N-methyl-2-mercaptoimidazolium bromide for endeavoring to both couple synthetic aggregates of precipitated silica to elastomers and enhancing electrical conductivity of such rubber compositions which contain less than 25 parts by weight carbon black per 100 parts by weight elastomer.

Said coupling agent materials may be provided for mixing with said diene-based rubber(s), for example, as individual materials, as at least one of said materials being supported on a carbon black carrier or as being pre-reacted, or otherwise pre-treated, with synthetic silica aggregates. The invention includes an article of manufacture, including a tire, having at least one component comprised of such rubber composition.

BACKGROUND FOR THE INVENTION

For various applications utilizing rubber compositions, carbon black and/or synthetic amorphous silica-based materials are conventionally used as particulate reinforcing fillers for the elastomer(s) of the rubber composition(s).

Sometimes, such silica reinforced rubber compositions contain only a minimal amount of carbon black reinforcement, such as for example, 25 parts by weight or less based upon 100 parts by weight of the elastomer, and often 10 parts by weight or even less. For rubber compositions with such a small amount of carbon black contend, the rubber composition typically has a very high electrical resistivity which is sometimes undesirable.

Also, often a coupling agent is used together with the silica in order to couple, or otherwise enhance, its elastomer reinforcement effect for the elastomer(s) and such use of a coupling agent is well known to those having skill in such art.

Historically, such coupling agents may be, for example, silane-based compounds which have one moiety (a silane-based moiety such as, for example, an alkoxysilane moiety) which is reactive with hydroxyl groups (e.g. silanol groups) on the surface of a synthetic amorphous silica and having another moiety (e.g. a polysulfide bridge) which becomes interactive with a conjugated diene-based elastomer.

For example, bis-(3-trialkoxysilylpropyl)polysulfides having an average of from 2 to 4 connecting sulfur atoms in their polysulfidic bridge are often used as a coupling agent (or adhesive) to enhance coupling of synthetic amorphous silicas, such as aggregates of precipitated silica, to various conjugated diene-based elastomers. Use of such coupling agents is well known to those having skill in such art.

However, use of such silane/polysulfide coupling agents do not serve to reduce inherent high electrical resistivity of silica reinforced rubber compositions which contain only a minimal amount of carbon black, if any.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

SUMMARY AND PRACTICE OF THE INVENTION

In accordance with one aspect of this invention, a rubber composition is provided which comprises, based upon parts by weight per 100 parts by weight rubber (phr):

(A) 100 parts by weight of at least one diene hydrocarbon based elastomer, (B) about 25 to about 90, optionally about 35 to about 90, phr of particulate reinforcing filler comprised of about 10 to about 70, phr of synthetic amorphous silica aggregates and, correspondingly, from zero to about 25, alternately about 5 to about 20, phr of at least one of carbon black and silica treated carbon black having domains of silica on its surface, wherein said silica aggregates and said silica domains on the surface of said treated carbon black contain hydroxyl groups (e.g. silanol groups) on their surface; and (C) about 0.5 to about 10, preferably about 1 to about 7, phr of a coupling agent selected from one of N-3-(1,2-dihydroxypropyl)-N-oleylammonium bromide, or N-3-(1,2-dihydroxypropyl)-N-methyl-2-mercaptoimidazolium bromide;

wherein said coupling agent is provided and mixed with said elastomer(s), according to one or more of the following:

(1) mixing said N-3-(1,2-dihydroxypropyl)-N-oleylammonium bromide or N-3-(1,2-dihydroxypropyl)-N-methyl-2-mercaptoimidazolium bromide with said elastomer(s) and said particulate reinforcement, preferably in an internal rubber mixer.

(2) pre-reacting said N-3-(1,2-dihydroxypropyl)-N-oleylammonium bromide or N-3-(1,2-dihydroxypropyl)-N-methyl-2-mercaptoimidazolium bromide with (a) precipitated silica aggregates, or (b) an aqueous dispersion of colloidal silica particles from which precipitated silica aggregates are recovered to form a silica composite thereof, (3) mixing said N-3-(1,2-dihydroxypropyl)-N-oleylammonium bromide or N-3-(1,2-dihydroxypropyl)-N-methyl-2-mercaptoimidazolium bromide with said elastomer(s) and said particulate reinforcement, preferably in an internal rubber mixer, according to any of said steps (1) or (2) wherein said particulate reinforcement includes at least one of said synthetic precipitated silica aggregates which has been pre-hydrophobated prior to mixing with said elastomers by reaction with an alkylsilane of the general formula (I):

$$X_n\text{—Si—}R_{4-n} \tag{I}$$

wherein X is a radical selected from alkoxy radicals having from 1 through 3 carbon atoms, preferably selected from methoxy and ethoxy radicals, and from halogen radicals selected from at least one of chlorine and bromine radicals, preferably a chlorine radical R is an alkyl radical having from 1 to 18 carbon atoms, preferably from 1 through 4 carbon atoms and more preferably selected from methyl and ethyl groups and n is an integer of 1 through 3, (4) mixing said N-3-(1,2-dihydroxypropyl)-N-oleylammonium bromide or N-3-(1,2-dihydroxypropyl)-N-methyl-2-mercaptoimidazolium bromide with said elastomer (s) and particulate reinforcement and an alkylsilane of the said formula (I), preferably in an internal rubber mixer, and (5) mixing said N-3-(1,2-dihydroxypropyl)-N-oleylammonium bromide or N-3-(1,2-dihydroxypropyl)-N-methyl-2-mercaptoimidazolium bromide and said alkylsilane of formula (I) with said elastomer(s) and said particulate reinforcement, preferably in an internal rubber mixer, wherein said N-3-(1,2-dihydroxypropyl)-N-oleylammonium bromide or N-3-(1,2-dihydroxypropyl)-N-methyl-2-mercaptoimidazolium bromide and said alkylsilane of formula (I) have all been pre-reacted with
(a) synthetic precipitated silica aggregates, or
(b) an aqueous dispersion of colloidal silica particles from which precipitated silica aggregates are recovered to form a silica composite thereof.

In further accordance with this invention, an article of manufacture is provided a which contains at least one component comprised of the rubber composition of this invention.

If desired, an additional coupling agent in a form of a bis-(3-trialkoxyalkylsilane) polysulfide may be used having from 2 to 8, with an average of from 2 to 2.6 or from 3.5 to 4, sulfur atoms in its polysulfidic bridge may be used.

Such additional coupling agent may be, for example, bis-(3-triethoxysilylpropyl) polysulfide having from 2 to 8, with an average of from 2 to 2.6 or from 3.5 to 4, sulfur atoms in its polysulfidic bridge.

A significant aspect of the invention is the use of the N-3-(1,2-dihydroxypropyl)-N-oleylammonium bromide or N-3-(1,2-dihydroxypropyl)-N-methyl-2-mercaptoimidazolium bromide to enhance electrical conductivity of the rubber composition. It is envisioned herein that such phenomenon is accomplished by attachment of the diol (dihydroxy) portion of the bromide salt to the silica surface with water elimination and attachment of the oleyl or mercapto moiety to the diene polymer, giving a non-silane charged nitrogen salt bridge between the silica surface the diene rubber.

In additional accordance with this invention, a tire is provided which contains at least one component comprised of the rubber composition of this invention.

In further accordance with this invention, a tire is provided having a tread comprised of the rubber composition of this invention.

The synthetic amorphous silica may be selected from aggregates of precipitated silica, which is intended to include precipitated aluminosilicates as a co-precipitated silica and aluminum.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The carbon black with domains of exposed silica on its surface may be, for example, carbon black prepared by treatment of carbon black by reaction of an alkyl silane (e.g. an alkoxy silane) with carbon black or by co-fuming carbon black and silica at an elevated temperature. For example, see U.S. Pat. Nos. 5,679,728 and 6,028,137.

In practice, as hereinbefore discussed, the said N-3-(1,2-dihydroxypropyl)-N-oleylammonium bromide or N-3-(1,2-dihydroxypropyl)-N-methyl-2-mercaptoimidazolium bromide may be provided as being supported on a carrier, such as carbon black, in order to promote an improved dispersion of the materials in the rubber composition. They may be provided as being supported on a carbon black carrier by a process such as, for example, by dissolving the materials in a volatile organic solvent such as, for example acetone, and adding the solvent solution to the particulate carbon black, then removing the solvent.

It is envisioned herein that the dihydroxyl or diol portion of the N-3-(1,2-dihydroxypropyl)-N-oleylammonium bromide or N-3-(1,2-dihydroxypropyl)-N-methyl-2-mercaptoimidazolium bromide, as the case may be, and for example only, react with hydroxyl groups (e.g. silanol, groups) contained on the precipitated silica. In turn, it is envisioned herein that the oleyl olefinic of the N-3-(1,2-dihydroxypropyl)-N-oleylammonium bromide or the mercapto portion N-3-(1,2-dihydroxypropyl)-N-methyl-2-mercaptoimidazolium bromide, as the case may be, and for example only, interact with the elastomer host to thereby aid in coupling the silica to the elastomer.

Alternately, the coupling agent may be pre-formed prior to addition to said elastomer(s) by, for example only, pre-treatment of synthetic silica aggregates with the coupling agent.

Accordingly, hereinbefore discussed, the N-3-(1,2-dihydroxypropyl)-N-oleylammonium bromide or N-3-(1,2-dihydroxypropyl)-N-methyl-2-mercaptoimidazolium bromide, as the case may be, precipitated silica and/or or silica-containing carbon black, particularly aggregates of precipitated silica may be individually mixed with a diene-based elastomer in an internal rubber mixer to a temperature, for example, in a range of from about 125° C. to about 190° C. wherein the said dihydroxyl or diol moiety is allowed to react with hydroxyl groups contained on the surface of said silica material (e.g. silanol groups) in situ within the elastomer host.

It is preferred that such in situ reaction within the elastomer host is accomplished without an appreciable, and preferably in the absence of, evolution of an alcohol. Indeed, by the inherent chemistry of a conventional reaction of said dihydroxyl or diol moiety of the non-silane coupler with hydroxyl groups contained on the surface of said silica material, water as a by-product of the reaction is evolved instead of an alcohol.

In the further practice of the invention, the aforesaid in situ reaction of said non-silane coupler and a silica material within the elastomer host via said internal rubber mixing process is accomplished wherein said silica material is a precipitated silica and/or silica-containing carbon black which is hydrophobated prior to its addition to the elastomer (pre-hydrophobated). Such in situ reaction is considered herein to be important as to both the process of mixing and reacting of the diol moiety of the non-silane coupler and pre-hydrophobated silica material as to a resulting product thereof In particular, is it considered herein that pre-hydrophobation of the silica material, particularly with an alkyl silane or alkoxy silane, enables a more efficient mixing, or processing, of it within the elastomer host in that such pre-hydrophobation of the silica material (A) renders it more compatible with the diene-based elastomer and (B) substantially reduces a tendency for a precipitated silica to re-agglomerate with itself within the elastomer host.

Moreover, the accompanying in situ reaction of the rubber-reactive moiety of the non-silane coupler enables both the more efficient mixing coupled with the associated reaction with only a minimal evolution of an alcohol, preferably no evolution of alcohol from the rubber composition.

In an additional practice of the invention, a reaction of said dihydroxyl or diol moiety with said silica material is accomplished without an appreciable in situ reaction thereof within the elastomer host. In such method, said dihydroxyl or diol is (A) reacted with said silica material or is (B) reacted in combination with a hydrophobating agent (a pre-treatment of the silica) prior to addition to the diene-based elastomer in an internal rubber mixer.

Use of such pre-treated silica is considered herein to be important as to both the process of mixing and the prevention of silica re-agglomeration and hydrophobating agent treated silica material as to a resulting product thereof In particular, is it considered herein that pre-hydrophobation of the silica material, particularly with an alkyl silane or alkoxy silane, enables a more efficient mixing, or processing, of it within the elastomer host in that such pre-hydrophobation of the silica material (A) renders it more compatible with the diene-based elastomer and (B) substantially reduces a tendency for a precipitated silica to re-agglomerate with itself within the elastomer host.

Moreover, use of the silica material having been pre-treated with both the non-silane silica reactive coupler and hydrophobating agent enables both the more efficient mixing of the silica material with the associated diene-based elastomer(s) coupled with the associated reaction of the rubber-reactive coupler within the elastomer host with only a minimal evolution of an alcohol, preferably no evolution of alcohol from the rubber composition.

The hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the aforesaid *Encyclopedia of Chemical Technology*, Fourth Edition (1997), Volume 21, Kirk-Othmer, in Pages 1020 through 1026, and U.S. Pat. No. 5,094,829, as well as U.S. Pat. Nos. 5,708,069, 5,789,514 and 5,750,610 for a more detailed discussion.

Representative alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

In practice, various diene-based elastomers may be used such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In the further practice of this invention, particulate reinforcement for the rubber composition may be particulate synthetic amorphous silica, or a combination of carbon black and amorphous silica (exclusive of silica treated carbon black), usually of an amount in a range of about 35 to about 100 alternately about 35to about 90, phr. If a combination of such carbon black and silica is used, usually at least about 5 phr of carbon black and at least 10 phr of silica are used. For example, a weight ratio of silica to carbon black ranging from about 1/5 to 5/1 might be used. Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm3/100 g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1to about 5 phr. Typical amounts of processing aids comprise about 1 to about 50 phr. Such processing aids can include, for example, aromatic, napthenic, and/or paraffinic processing oils. Typical amounts of antioxidants comprise about 1to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization a non-silane containing coupling agent for enhancing reinforcement of a conjugated diene-based elastomer with a particulate synthetic amorphous silica material which contains hydroxyl groups (e.g. silanol groups) on its surface.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE I

An N-3-(1,2-dihydroxypropyl)-N-oleylammonium bromide salt (a low melting point wax-like, amber colored material) was prepared by adding 26.5 g (0.10 mole) of oleylamine and 15.5 (0.10 mole) of 3-bromo-1,2-propanediol to a one liter glass open top container and the mixture and heated to about 150° C. for about 30 minutes under a nitrogen atmosphere to yield the N-3-(1,2-dihydroxylpropyl)-N-oleylammonium bromide which was recovered and dissolved (26.1 g) in 100 ml of 95 percent ethanol. The ethanolic solution was charged with 26.1 g of N330 carbon black with stirring. The ethanol was removed therefrom at room temperature (e.g. 23° C.) to yield 52 g of a composite of the salt and carbon black a carrier for the salt. The composite was therefore fifty percent by weight carbon black and fifty percent by weight of the salt.

Precipitated silica reinforced rubber compositions were prepared and reported herein as Samples A, B and C with Sample A and Sample B being Control Samples.

Control Sample A was comprised of natural rubber, styrene/butadiene rubber and 3,4-polyisoprene rubber together with a precipitated silica without a coupling agent. Control Sample B was similar to Control Sample A except a bis (3-triethoxysilylpropyl) tetrasulfide was added as a coupling agent for the silica. Sample C was similar to Control Sample A except that the N-3-(1,2-dihydroxypropyl)-N-oleylammonium bromide salt prepared in this Example was added as a coupling agent.

The following Table 1 illustrates the compositions of the Samples.

TABLE 1

| Material | Control Sample A | Control Sample B | Sample C |
|---|---|---|---|
| Non-productive Mixing Steps (160° C.) | | | |
| Natural rubber (cis-1,4-polyisoprene) | 55 | 55 | 55 |
| Styrene/butadiene rubber[1] | 30 | 30 | 30 |
| 3,4-polyisoprene rubber[2] | 15 | 15 | 15 |
| Carbon black, N299[3] | 38 | 38 | 38 |
| Precipitated silica[4] | 10 | 10 | 10 |
| Coupling agent, tetrasulfide[5] | 0 | 2 | 0 |
| Non-silane coupling agent[6] | 0 | 0 | 2 |
| Processing aids[7] | 9 | 9 | 9 |
| Antidegradants | 3 | 3 | 3 |
| Zinc oxide | 2.5 | 2.5 | 2.5 |
| Productive mixing step (120° C.) | | | |
| Sulfur | 1.1 | 1.1 | 1.1 |
| Accelerator(s)[8] | 1.5 | 1.5 | 1.5 |

[1]Styrene/butadiene rubber, prepared by organic solution polymerization, obtained as SLF1216 from The Goodyear Tire & Rubber Company
[2]Obtained from the Goodyear Tire & Rubber Company
[3]carbon black N299, an ASTM designation
[4]Obtained as Hi-Sil ® 210 from PPG Industries
[5]bis (3-triethoxysilylpropyl) tetrasulfide on carbon black on a 50/50 weight basis obtained as X50S from Degussa
[6]Product of this example, as a composite composed of N-3-(1,2-dihydroxypropyl)- N-oleylammonium bromide salt and carbon black on a 50/50 weight basis
[7]Processing oil, stearic acid and waxes
[8]Sulfenamide type Various physical properties of the Samples (cured and cured) are reported in the following Table 2.

The term "NMIR" refers to a "moving die rheometer" analytical instrument and the term "RPA" refers to a "rubber process analyzer" analytical instrument.

TABLE 2

| Properties | Control Sample A | Control Sample B | Sample C |
|---|---|---|---|
| MDR (150° C.) | | | |
| T25, minutes | 6.3 | 5.7 | 5.2 |
| T90, minutes | 10.9 | 10.4 | 9.2 |
| RPA (191° C. cure, 1 Hz) | | | |
| Uncured G' (100° C., 0.83 Hz) 15% strain (elongation) | 182 | 170 | 153 |
| Cured G' (100° C., 1 Hz) 1% strain (elongation) | 1312 | 1435 | 1413 |
| Cured G' (100° C., 1 Hz) 50% strain (elongation) | 641 | 701 | 672 |
| Tan delta (60° C., 11 Hz) | | | |
| 0.1% strain (elongation) | 0.0867 | 0.0835 | 0.0807 |
| Instron Instrument Stress-Strain (cured 14 min. at 160° C.) | | | |
| Modulus, 100% (MPa) | 1.64 | 1.85 | 1.67 |
| Surface electrical resistivity (ohm*cm) | 838510 | N/A | 439000 |

The electrical resistivities of the Samples were determined by a Keithley Electrometer in units of ohm*cm.

From Table 2 it can be seen that a reduced electrical resistivity (increased electrical conductivity) is observed for Sample C as compared to Control Sample A, as well as improved modulii and hardness and a reduced tan delta at 60° C. (reduced rolling resistance and cooler running).

This is considered herein to be significant because the electrostatic built up relating to a tire tread with low carbon black content (e.g. where most of its carbon black reinforcement is replaced with precipitated silica filler) can be more efficiently dissipated from the tire tread to the road. Also, it is seen that the predictive durability of the tire is increased well as a predictive cooler running tire and reduced treadwear for the tire tread are expected.

Furthermore, a substantially reduced rubber viscosity of Sample C is seen as compared to Control Samples A and B (as evidenced by the above uncured G' values) which is indicative of improved rubber processing for Sample C.

EXAMPLE II

A N-3-(1,2-dihydroxylpropyl)-N-methyl-2-mercaptoimidazolium bromide salt was prepared by adding 6.8 g (0.06 mole) 2-mercapto-1-methylimidazole to a one liter, open-top, glass reactor together with 9.3 g (0.06 mole) of 3-bromo-1,2-propanediol and the mixture heated to about 150° C. for about 30 minutes under a nitrogen atmosphere to yield the above azolium salt product which was, in turn, was dissolved (17.4 g) in 40 ml of 95 percent ethanol. The ethanolic solution was blended with 17.4 g of N330 carbon black with stirring. The ethanol was removed therefrom at room temperature (e.g. 23° C.) to yield 34 g of a composite of the azolium salt and carbon black (as a carrier for the salt). The resulting composite was composed of 50 percent by weight carbon black and 50 percent by weight of the azolium salt.

Precipitated silica reinforced rubber compositions were prepared and reported herein as Samples D, E and F with Sample D and Sample E being Control Samples.

Control Sample D was comprised of natural rubber, styrene/butadiene rubber and 3,4-polyisoprene rubber together with a precipitated silica without a coupling agent.

Control Sample E was similar to Control Sample A except a bis(3-triethoxysilylpropyl)tetrasulfide was added as a coupling agent for the silica.

Sample F was similar to Control Sample A except that the N-3-(1,2-dihydroxylpropyl)-N-methyl-2-mercaptoimidazolium bromide salt prepared in this Example was added as a coupling agent.

The formulations and mixing steps for Control Sample D and Control Sample E were the same as those for Control Sample A and Control Sample B, respectively, used in Example I.

The formulation and mixing step for Sample F was the same as for Sample C of Example I except that the N-3-(1, 2-dihydroxylpropyl)-N-methyl-2-mercaptoimidazolium bromide salt (2 phr) prepared in this Example II was used for the non-silane coupling agent instead of the non-silane coupling agent used in Example I.

Various physical properties of the Samples (cured and cured) are reported in the following Table 3.

TABLE 3

| Properties | Control Sample D | Control Sample E | Sample F |
|---|---|---|---|
| MDR (150° C.) | | | |
| T25, minutes | 6.3 | 5.7 | 5.6 |
| T90, minutes | 10.9 | 10.4 | 10 |
| RPA (191° C. cure | | | |
| Uncured G' (100° C., 0.83 Hz) 15% strain (elongation) | 182 | 170 | 170 |
| Cured G' (100° C., 1 Hz) 1% strain (elongation) | 1312 | 1435 | 1610 |
| Cured G' (100° C., 1 Hz) 50% strain (elongation) | 641 | 701 | 703 |
| Tan delta (60° C., 11 Hz) | | | |
| 0.1% strain (elongation) | 0.0867 | 0.0835 | 0.0757 |
| DIN abrasion, cm$^3$ loss | 159 | 125 | 142 |
| Instron Instrument Stress-Strain (cured 14 min. at 160° C.) | | | |
| 100% modulus (MPa) | 1.64 | 1.85 | 1.82 |
| 300% modulus (MPa) | 8.59 | 10.28 | 9.42 |
| Tensile strength (MPa) | 18 | 18.63 | 18.05 |
| Elongation at Break (%) | 509 | 483 | 491 |
| Rebound | | | |
| 23° C. | 46.2 | 47.7 | 45.3 |
| 100° C. | 65.7 | 67.3 | 65.2 |
| Hardness (Shore A) | | | |
| 23° C. | 59.9 | 62.2 | 61.9 |
| 100° C. | 51.8 | 53.9 | 53.3 |
| DIN Abrasion (cm$^3$ loss) | 159 | 125 | 142 |
| Surface electrical resistivity (ohm*cm) (Keithley Instrument) | 832510 | N/A | 588260 |

From Table 3 it can be seen that a reduced electrical resistivity (increased electrical conductivity) is observed for Sample F as compared to Control Sample D.

This is considered herein to be significant because the electrostatic built up relating to a tire tread with low carbon black content (e.g. where most of its carbon black reinforcement is replaced with precipitated silica filler) of Sample F can be more efficiently dissipated from the tire tread to the road.

Also, it is seen that Sample F as compared to Control Sample D shows improved modulii and hardness, increased resistance to abrasion and a lower tan delta at 60° C. (less hysteresis). This is considered herein to be significant because this is predictive, or a tire with tread of Sample F, of a more durable tire with less treadwear and a cooling running tire.

While certain representative embodiments and details have been shown or illustrated for the purpose of illustrating the invention, it will be apparent to those skilled in this art that various changes and modifications may be made therein without departing from the spirit or scope of the invention.

What is claimed is:

1. A rubber composition which comprises, based upon parts by weight per 100 parts by weight rubber (phr):

(A) 100 parts by weight of at least one diene hydrocarbon based elastomer, (B) about 25 to about 90 phr of particulate reinforcing filler comprised of about 10 to about 70 phr of synthetic amorphous silica aggregates and, correspondingly, from zero to about 25 phr of at least one of carbon black and silica treated carbon black having domains of silica on its surface, wherein said silica aggregates and said silica domains on the surface of said treated carbon black contain hydroxyl groups (e.g. silanol groups) on their surface; and (C) about 0.5 to about 10 phr of a coupling agent selected from one of N-3-(1,2-dihydroxypropyl)-N-oleylammonium bromide, or N-3-(1,2-dihydroxypropyl)-N-methyl-2-mercaptoimidazolium bromide;

wherein said coupling agent is provided and mixed with said elastomer(s), according to one or more of the following:

(1) mixing said N-3-(1,2-dihydroxypropyl)-N-oleylammonium bromide or N-3-(1,2-dihydroxypropyl)-N-methyl-2-mercaptoimidazolium bromide with said elastomer(s) and said particulate reinforcement;

(2) pre-reacting said N-3-(1,2-dihydroxypropyl)-N-oleylammonium bromide or N-3-(1,2-dihydroxypropyl)-N-methyl-2-mercaptoimidazolium bromide with (a) precipitated silica aggregates, or (b) an aqueous dispersion of colloidal silica particles from which precipitated silica aggregates are recovered to form a silica composite thereof, (3) mixing said N-3-(1,2-dihydroxypropyl)-N-oleylammonium bromide or N-3-(1,2-dihydroxypropyl)-N-methyl-2-mercaptoimidazolium bromide with said elastomer(s) and said particulate reinforcement according to any of said steps (1) or (2) wherein said particulate reinforcement includes at least one of said synthetic precipitated silica aggregates which has been pre-hydrophobated prior to mixing with said elastomers by reaction with an alkylsilane of the general formula (I):

$$X_n\text{—Si—}R_{4-n} \qquad (I)$$

wherein X is a radical selected from alkoxy radicals having from 1 through 3 carbon atoms, preferably selected from methoxy and ethoxy radicals, and from halogen radicals selected from at least one of chlorine and bromine radicals, preferably a chlorine radical; R is an alkyl radical having from 1 to 18 carbon atoms, preferably from 1 through 4 carbon atoms and more preferably selected from methyl and ethyl groups; and n is an integer of 1 through 3, (4) mixing said N-3-(1,2-dihydroxypropyl)-N-oleylammonium bromide or N-3-(1,2-dihydroxypropyl)-N-methyl-2-mercaptoimidazolium bromide with said elastomer(s) and particulate reinforcement and an alkylsilane of the said formula (I), and (5) mixing said N-3-(1,2-dihydroxypropyl)-N-oleylammonium bromide or N-3-(1,2-dihydroxypropyl)-N-methyl-2-mercaptoimidazolium bromide and said alkylsilane of formula (I) with said elastomer(s) and said particulate reinforcement, wherein said N-3-(1,2-dihydroxypropyl)-N-oleylammonium bromide or N-3-(1,2-dihydroxypropyl)-N-methyl-2-mercaptoimidazolium bromide and said alkylsilane of formula (I) have all been pre-reacted with (a) synthetic precipitated silica aggregates or (b) an aqueous dispersion of colloidal silica particles from which precipitated silica aggregates are recovered to form a silica composite thereof.

2. The rubber composition of claim 1 wherein said coupling agent is said N-3-(1,2-dihydroxypropyl)-N-oleylammonium bromide.

3. The rubber composition of claim 1 wherein said coupling agent is said N-3-(1,2-dihydroxypropyl)-N-methyl-2-mercaptoimidazolium bromide.

4. The rubber composition of claim 1 wherein an additional coupling agent in a form of a bis-(3-trialkoxyalkylsilane)polysulfide is used in the rubber composition having from 2 to 8, with an average of from 2 to 2.6 or from 3.5 to 4, sulfur atoms in its polysulfidic bridge.

5. The rubber composition of claim 2 wherein an additional coupling agent in a form of a bis-(3-trialkoxyalkylsilane)polysulfide is used in the rubber composition having from 2 to 8, with an average of from 2 to 2.6 or from 3.5 to 4, sulfur atoms in its polysulfidic bridge.

6. The rubber composition of claim 3 wherein an additional coupling agent in a form of a bis-(3-trialkoxyalkylsilane)polysulfide is used in the rubber composition having from 2 to 8, with an average of from 2 to 2.6 or from 3.5 to 4, sulfur atoms in its polysulfidic bridge.

7. The rubber composition of claim 1 wherein said coupling agent is provided and mixed with said elastomer(s) by mixing said N-3-(1,2-dihydroxypropyl)-N-oleylammonium bromide or N-3-(1,2-dihydroxypropyl)-N-methyl-2-mercaptoimidazolium bromide with said elastomer(s) and said particulate reinforcement.

8. The rubber composition of claim 1 wherein said coupling agent is provided and mixed with said elastomer(s) by pre-reacting said N-3-(1,2-dihydroxypropyl)-N-oleylammonium bromide or N-3-(1,2-dihydroxypropyl)-N-methyl-2-mercaptoimidazolium bromide with (A) precipitated silica aggregates, or (B) an aqueous dispersion of colloidal silica particles from which precipitated silica aggregates are recovered to form a silica composite thereof.

9. The rubber composition of claim 1 wherein said coupling agent is provided and mixed with said elastomer(s) by mixing said N-3-(1,2-dihydroxypropyl)-N-oleylammonium bromide or N-3-(1,2-dihydroxypropyl)-N-methyl-2-mercaptoimidazolium bromide with said elastomer(s) and said particulate reinforcement according to any of said steps (1) or (2) wherein said particulate reinforcement includes at least one of said synthetic precipitated silica aggregates which has been pre-hydrophobated prior to mixing with said elastomers by reaction with an alkylsilane of the general formula (I):

$$X_n\text{—Si—}R_{4-n} \qquad (I)$$

wherein X is a radical selected from alkoxy radicals having from 1 through 3 carbon atoms, preferably selected from methoxy and ethoxy radicals, and from halogen radicals selected from at least one of chlorine and bromine radicals, preferably a chlorine radical; R is an alkyl radical having from 1 to 18 carbon atoms, preferably from 1 through 4 carbon atoms and more preferably selected from methyl and ethyl groups; and n is an integer of 1 through 3.

10. The rubber composition of claim 1 wherein said coupling agent is provided and mixed with said elastomer(s) by mixing said N-3-(1,2-dihydroxypropyl)-N-oleylammonium bromide or N-3-(1,2-dihydroxypropyl)-N-methyl-2-mercaptoimidazolium bromide with said elastomer(s) and particulate reinforcement and an alkylsilane of the said formula (I).

11. The rubber composition of claim 1 wherein said coupling agent is provided and mixed with said elastomer(s) by mixing said N-3-(1,2-dihydroxypropyl)-N-oleylammonium bromide or N-3-(1,2-dihydroxypropyl)-N-methyl-2-mercaptoimidazolium bromide and said alkylsilane of formula (I) with said elastomer(s) and said particulate reinforcement, wherein said N-3-(1,2-dihydroxypropyl)-N-oleylammonium bromide or N-3-(1,2-dihydroxypropyl)-N-methyl-2-mercaptoimidazolium bromide and said alkylsilane of formula (I) have all been pre-reacted with (A) synthetic precipitated silica aggregates or
(B) an aqueous dispersion of colloidal silica particles from which precipitated silica aggregates are recovered to form a silica composite thereof.

12. An article of manufacture which contains at least one component comprised of the rubber composition of claim 1.

13. A tire containing at least one component comprised of the rubber composition of claim 1.

14. A tire containing at least one component comprised of the rubber composition of claim 2.

15. A tire containing at least one component comprised of the rubber composition of claim 3.

16. A tire containing at least one component comprised of the rubber composition of claim 4.

17. A tire having a tread comprised of the rubber composition of claim 1.

18. A tire having a tread comprised of the rubber composition of claim 2.

19. A tire having a tread comprised of the rubber composition of claim 3.

20. A tire having a tread comprised of the rubber composition of claim 4.

* * * * *